United States Patent
Ironmonger et al.

(10) Patent No.: US 10,843,069 B2
(45) Date of Patent: Nov. 24, 2020

(54) INPUT APPARATUS FOR A COMPUTER

(71) Applicant: Ironburg Inventions Limited, Wincanton (GB)

(72) Inventors: Duncan Ironmonger, Suwanee, GA (US); Carl S. Jeffrey, Cheltenham (GB)

(73) Assignee: Ironburg Inventions Limited, Wincanton (GB)

( * ) Notice: Subject to any disclaimer, the term of this patent is extended or adjusted under 35 U.S.C. 154(b) by 0 days.

(21) Appl. No.: 16/323,645

(22) PCT Filed: Aug. 4, 2017

(86) PCT No.: PCT/GB2017/052312
§ 371 (c)(1),
(2) Date: Feb. 6, 2019

(87) PCT Pub. No.: WO2018/029450
PCT Pub. Date: Feb. 15, 2018

(65) Prior Publication Data
US 2019/0176033 A1    Jun. 13, 2019

Related U.S. Application Data

(60) Provisional application No. 62/373,456, filed on Aug. 11, 2016.

(51) Int. Cl.
*A63F 13/00* (2014.01)
*A63F 13/24* (2014.01)
(Continued)

(52) U.S. Cl.
CPC ............ *A63F 13/24* (2014.09); *A63F 13/211* (2014.09); *G06F 3/0202* (2013.01); *A63F 2300/105* (2013.01); *A63F 2300/1043* (2013.01)

(58) Field of Classification Search
None
See application file for complete search history.

(56) References Cited

U.S. PATENT DOCUMENTS

| 4,032,728 A | 6/1977 | Oelsch |
| 4,786,768 A | 11/1988 | Langewis et al. |

(Continued)

FOREIGN PATENT DOCUMENTS

| CN | 202 528 096 U | 11/2012 |
| CN | 203 077 157 U | 7/2013 |

(Continued)

OTHER PUBLICATIONS

Graham, Mark, Controller, Nov. 3, 2005, WIPO 2005/103869, pp. 1-37 (Year: 2005).*

(Continued)

*Primary Examiner* — Jay Trent Liddle
*Assistant Examiner* — Alex P. Rada, II
(74) *Attorney, Agent, or Firm* — Walters & Wasylyna LLC

(57) ABSTRACT

The invention provides an apparatus for supplying user inputs to a computer program, a games controller and an actuator mounted to a controller. The apparatus comprises a case having a first part and a second part. Each of the first and second parts comprise one or more controls. One of the first and second parts comprises a sensor for determining the position of the first part relative to the second part, wherein the position of the first part relative to the second part provides an input control device.

18 Claims, 9 Drawing Sheets

(51) Int. Cl.
*A63F 13/211* (2014.01)
*G06F 3/02* (2006.01)

(56) References Cited

U.S. PATENT DOCUMENTS

| | | | |
|---|---|---|---|
| 5,267,181 A * | 11/1993 | George | G06F 3/023 |
| | | | 708/142 |
| 5,430,262 A | 7/1995 | Matsui et al. | |
| 5,451,053 A | 9/1995 | Garrido | |
| 5,773,769 A | 6/1998 | Raymond | |
| 5,841,372 A | 11/1998 | Matsumoto | |
| 5,874,906 A | 2/1999 | Willner et al. | |
| 5,883,690 A | 3/1999 | Meyers et al. | |
| 5,989,123 A | 11/1999 | Tosaki et al. | |
| 6,203,432 B1 | 3/2001 | Roberts et al. | |
| 6,251,015 B1 | 6/2001 | Caprai | |
| 6,512,511 B2 | 1/2003 | Willner et al. | |
| 6,710,766 B1 | 3/2004 | Ogata | |
| 6,752,719 B2 | 6/2004 | Himoto et al. | |
| 6,760,013 B2 | 7/2004 | Willner et al. | |
| 6,853,308 B1 | 2/2005 | Dustin | |
| 7,510,477 B2 | 3/2009 | Argentar | |
| 7,758,424 B2 | 7/2010 | Riggs et al. | |
| 7,859,514 B1 | 12/2010 | Park | |
| 7,993,203 B1 | 8/2011 | Walker, II et al. | |
| 8,641,525 B2 | 2/2014 | Burgess et al. | |
| 8,777,620 B1 | 7/2014 | Baxter | |
| 9,089,770 B2 | 7/2015 | Burgess et al. | |
| 9,804,691 B1 | 10/2017 | Strahle et al. | |
| 2001/0003713 A1 | 6/2001 | Willner et al. | |
| 2001/0025778 A1 | 10/2001 | Ono | |
| 2002/0052237 A1 | 5/2002 | Magill | |
| 2002/0128064 A1 | 9/2002 | Sobota | |
| 2003/0067111 A1 | 4/2003 | Swan | |
| 2004/0259059 A1 | 12/2004 | Aoki | |
| 2005/0083297 A1 | 4/2005 | Duncan | |
| 2005/0215321 A1 | 9/2005 | Hussaini et al. | |
| 2005/0230230 A1 | 10/2005 | Ueshima et al. | |
| 2005/0277470 A1 | 12/2005 | Watanachote | |
| 2006/0025217 A1 | 2/2006 | Hussaini et al. | |
| 2006/0116204 A1 | 6/2006 | Chen et al. | |
| 2007/0281787 A1 | 12/2007 | Numata et al. | |
| 2008/0188306 A1 | 8/2008 | Tetterington et al. | |
| 2008/0261695 A1 | 10/2008 | Coe | |
| 2009/0054146 A1 | 2/2009 | Epstein | |
| 2009/0088250 A1 | 4/2009 | Carlson | |
| 2009/0258705 A1 | 10/2009 | Guinchard | |
| 2010/0073283 A1 | 3/2010 | Enright | |
| 2010/0167825 A1 | 7/2010 | Sternberg et al. | |
| 2010/0267454 A1 | 10/2010 | Navid | |
| 2010/0279773 A1 * | 11/2010 | Atzmon | A63F 13/06 |
| | | | 463/38 |
| 2010/0304865 A1 | 12/2010 | Picunko | |
| 2011/0065510 A1 | 3/2011 | Borrel | |
| 2011/0105231 A1 | 5/2011 | Ambinder et al. | |
| 2011/0256930 A1 | 10/2011 | Jaouen | |
| 2011/0281649 A1 | 11/2011 | Jaouen | |
| 2012/0088582 A1 * | 4/2012 | Wu | A63F 13/211 |
| | | | 463/37 |
| 2012/0142418 A1 | 6/2012 | Muramatsu | |
| 2012/0142419 A1 | 6/2012 | Muramatsu | |
| 2012/0172128 A1 | 7/2012 | Atzom | |
| 2012/0260220 A1 | 10/2012 | Griffin | |
| 2012/0299244 A1 | 11/2012 | Rice et al. | |
| 2012/0322553 A1 | 12/2012 | Burgess et al. | |
| 2012/0322555 A1 | 12/2012 | Burgess et al. | |
| 2013/0029763 A1 | 1/2013 | Zhou | |
| 2013/0147610 A1 | 6/2013 | Grant et al. | |
| 2013/0150155 A1 | 6/2013 | Barney et al. | |
| 2013/0196770 A1 | 8/2013 | Barney et al. | |
| 2014/0274397 A1 | 9/2014 | Sebastian | |
| 2015/0194279 A1 | 7/2015 | Rubio | |
| 2015/0234479 A1 | 8/2015 | Schantz et al. | |
| 2015/0238855 A1 | 8/2015 | Uy et al. | |
| 2015/0255918 A1 | 11/2015 | Riggs et al. | |
| 2016/0082349 A1 | 3/2016 | Burgess et al. | |
| 2016/0193529 A1 | 7/2016 | Burgess et al. | |
| 2016/0346682 A1 | 12/2016 | Burgess et al. | |
| 2017/0001107 A1 | 1/2017 | Burgess et al. | |
| 2017/0001108 A1 | 1/2017 | Burgess et al. | |
| 2017/0087456 A1 | 3/2017 | Burgess et al. | |
| 2017/0151494 A1 | 6/2017 | Ironmonger et al. | |
| 2017/0157509 A1 | 6/2017 | Burgess et al. | |
| 2019/0022522 A1 * | 1/2019 | Croft | A63F 13/24 |

FOREIGN PATENT DOCUMENTS

| | | |
|---|---|---|
| EP | 1 208 883 | 5/2002 |
| EP | 1852162 | 11/2007 |
| EP | 2 479 636 | 7/2012 |
| EP | 2 440 438 | 4/2013 |
| EP | 2 698 185 | 2/2015 |
| EP | 2 908 224 | 8/2015 |
| GB | 2 244 546 | 12/1991 |
| GB | 2 481 633 | 1/2012 |
| JP | H1020951 | 1/1998 |
| JP | 2001 084077 | 3/2001 |
| WO | WO 02/34345 | 5/2002 |
| WO | WO 03/046822 | 6/2003 |
| WO | WO 2005/103869 | 11/2005 |
| WO | WO 2007/040499 | 4/2007 |
| WO | WO 2008/131249 | 10/2008 |
| WO | WO 2012/036710 | 3/2012 |
| WO | WO 2014/187923 | 11/2014 |
| WO | 2015004261 | 1/2015 |
| WO | WO 2015/078990 | 6/2015 |
| WO | 2015110553 | 7/2015 |

OTHER PUBLICATIONS

Burns, "Review: Scuf Xbox 360 Controller," Xboxer360.com (2010).
"Rapid Fire Mod for Wireless Xbox 360 Controller," forum on xbox-scene.com, (2008).
"Thrustmaster USB game controller roundup," dansdata.com/tmsticks.htm (2002).
Coles, Olin, "Thrustmaster Run-N-Drive PC/PS3 Wireless Gamepad" BenchmarkReviews.com (2009).
Xbox 360 Wireless Controller Tour, published on May 13, 2005 at http://www.ign.com/articles/2005/05/13/xbox-360-wireless-controller-tour.
Patent Cooperation Treaty, "International Search Report and the Written Opinion of the International Searching Authority," PCT/GB2017/052312 (dated Oct. 18, 2017).

* cited by examiner

INPUT APPARATUS FOR A COMPUTER

This application is a U.S. national phase application of Intl. App. No. PCT/GB2017/052312 filed on Aug. 4, 2017, which claims priority from U.S. Ser. No. 62/373,456 filed on Aug. 11, 2016. The entire contents of Intl. App. No. PCT/GB2017/052312 and U.S. Ser. No. 62/373,456 are incorporated herein by reference.

FIELD

The invention relates to an input apparatus for a computer more particularly, but not exclusively, to controllers for controlling the play of computerized games. Aspects of the invention relate to a device for initiating commands or control function of a computer, to an input device and method for a game controller, and to a game controller for use with a gaming console or other computing device.

BACKGROUND

Electronic devices such as computers, games consoles, tablet computers, personal digital assistants, portable telephone devices and the like all need input means for enabling a human user to input commands and other information. The most commonly used input devices comprise key pads, touch pads or screens, buttons and analogue sticks—sometimes called control sticks, joy sticks or thumbsticks. All of these devices involve the concept of producing an electric signal as a response to a manipulation, gesture, actuation or movement by the user and as such can be described as electromechanical input devices.

There are many different types of gaming devices such as, but not limited to, personal computers, smartphones, tablet computers and dedicated gaming consoles currently available for operating a video game. For example, Microsoft®, Sony® and Nintendo® manufacture the Xbox®, PlayStation® and Wii® gaming consoles, respectively. The gaming devices may display information to a user via a display screen, projector or headset, for example in virtual reality systems. The gaming consoles typically include a game controller so that a user can control the operation of the video game.

Controllers for most current games consoles are generally intended to be held and operated by the user using both hands. A conventional controller will generally comprise a hard outer case with a plurality of controls mounted about the controller. Typically the controls include buttons, analogue control sticks, bumpers and triggers.

Some known game controllers include a form of actuator system for the operation of control of the functions of the video games. Actuators, buttons or other depressible or manually operable devices are typically used for controlling discrete actions such as the firing of a weapon or issuing an attack command. It is known to provide a button, actuator, or other controls, on the front and top of the controller. Controls mounted on the top of the controller are intended to be operable by the index fingers of a user; such buttons are commonly known as triggers or bumpers. Controls mounted on the front of the controller are intended to be operable by the thumbs of a user; such controls may include left and right analogue thumb sticks, which normally control movement and are intended to be operated by the user's left and right thumbs respectively. There may be additional buttons located on a forward right portion of the front of the controller, which normally control additional actions and are intended to be operated by the user's right thumb. There may be provided a direction pad located on the rearward left portion of the front of the controller. The direction pad is intended to be operated by the user's left thumb, typically either as an alternative to the left thumb stick or to provide additional actions. The controllers typically have a pair of handles or grip portions to enable a user to hold the controller; typically the user will employ the middle, ring and/or little finger of each hand to grasp a respective handle.

Due to the rapidly expanding gaming market and the development of involved games invoking considerable player input, it is desirable for players to be able to customize their controllers in order to gain increased control in a variety of gaming circumstances.

The present invention seeks to improve upon, or at least mitigate, some of the problems associated with controllers of the prior art by providing a game controller which includes an additional electromechanical input device, which provides a user with operational control of the functions of a video game.

A further object of the present invention is to provide a user with access to a plurality (two or more) of control functions from a single electromechanical input device. In this regard it is an object of the present invention to provide a device having a plurality of distinct or distinguishable degrees of freedom of movement requiring specific actuation gestures, manipulations or actions to activate a control function associated therewith.

SUMMARY

A first aspect of the present invention provides an apparatus for supplying user inputs to a computer program, the apparatus comprising:
  a case having a first part and a second part;
  each of the first and second parts comprising one or more controls; and
  at least one of the first and second parts comprising:
  a sensor for determining the position of the first part relative to the second part, wherein the position of the first part relative to the second part provides an input control device.
  Optionally, the sensor is analogue.
  Optionally, the first part is detachably connected to the second part.
  Optionally, the first part is pivotally coupled to the second part by a coupler rotatable about at least one rotation axis.
  Optionally, the first part is pivotally coupled to the second part by a coupler rotatable about three orthogonal rotation axes.
  Optionally, the coupler comprises a ball joint including a ball and socket arrangement.
  Optionally, the controller comprises a switch mechanism providing a digital input control.
  Optionally, the switch mechanism comprises a mechanical switch actuable by displacement of the first part relative to the second part.
  Optionally, the first part is mounted to the second part by a spherical bearing.
  Optionally, the first part is mounted to the second part by a trunnion and cradle arrangement.
  Optionally, the first and second parts comprise a plurality of controls located on a front and top of the apparatus and at least one additional control located on a rear of the apparatus.
  Optionally, each of the first and second parts comprise a handle having an opening for receiving at least in part a user's hand.

Optionally, the handle comprises a stirrup for engaging with the back of a user's hand.

Optionally, the first part is moveable with respect to the second part between a first condition in which the coupler is stowed at least in part within one of the first and second parts and a second deployed condition in which the first part is spaced apart from the second part.

A second aspect of the present invention provides an apparatus for supplying user inputs to a computer program, the apparatus comprising:

a case having a first part and a second part;

each of the first and second parts comprising one or more controls;

wherein the first part is pivotally coupled to the second part by a coupler rotatable about at least one rotation axis.

Optionally, the first part is coupled to the second part by a spherical bearing.

Optionally, the first part is coupled to the second part by a ball and socket arrangement.

Optionally, the case comprises a plurality of faces including a top, bottom, front and rear, the first and second parts each comprise a handle shaped to be held in one hand of a user such that the user's thumbs are positioned to operate controls located on a first one of the faces of the apparatus and such that the user's index fingers are positioned to operate controls located on a second one of the faces of the apparatus.

In some embodiments the apparatus is a games controller. Further features and advantages of the present invention will be apparent from the specific embodiment illustrated in the drawings and discussed below.

Within the scope of this application it is envisaged and intended that the various aspects, embodiments, examples, features and alternatives set out in the preceding paragraphs, in the claims and/or in the following description and drawings may be taken independently or in any combination thereof. For example, features described in connection with one embodiment are applicable to all embodiments unless there is incompatibility of features

BRIEF DESCRIPTION OF THE DRAWINGS

Exemplary embodiments of the invention will now be described with reference to the accompanying drawings, in which.

DETAILED DESCRIPTION

Detailed descriptions of specific embodiments of computer input apparatus, game controllers and actuators are disclosed herein. It will be understood that the disclosed embodiments are merely examples of the way in which certain aspects of the invention can be implemented and do not represent an exhaustive list of all of the ways the invention may be embodied. Indeed, it will be understood that the computer input apparatus, game controllers and actuators described herein may be embodied in various and alternative forms. The Figures are not necessarily to scale and some features may be exaggerated or minimized to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
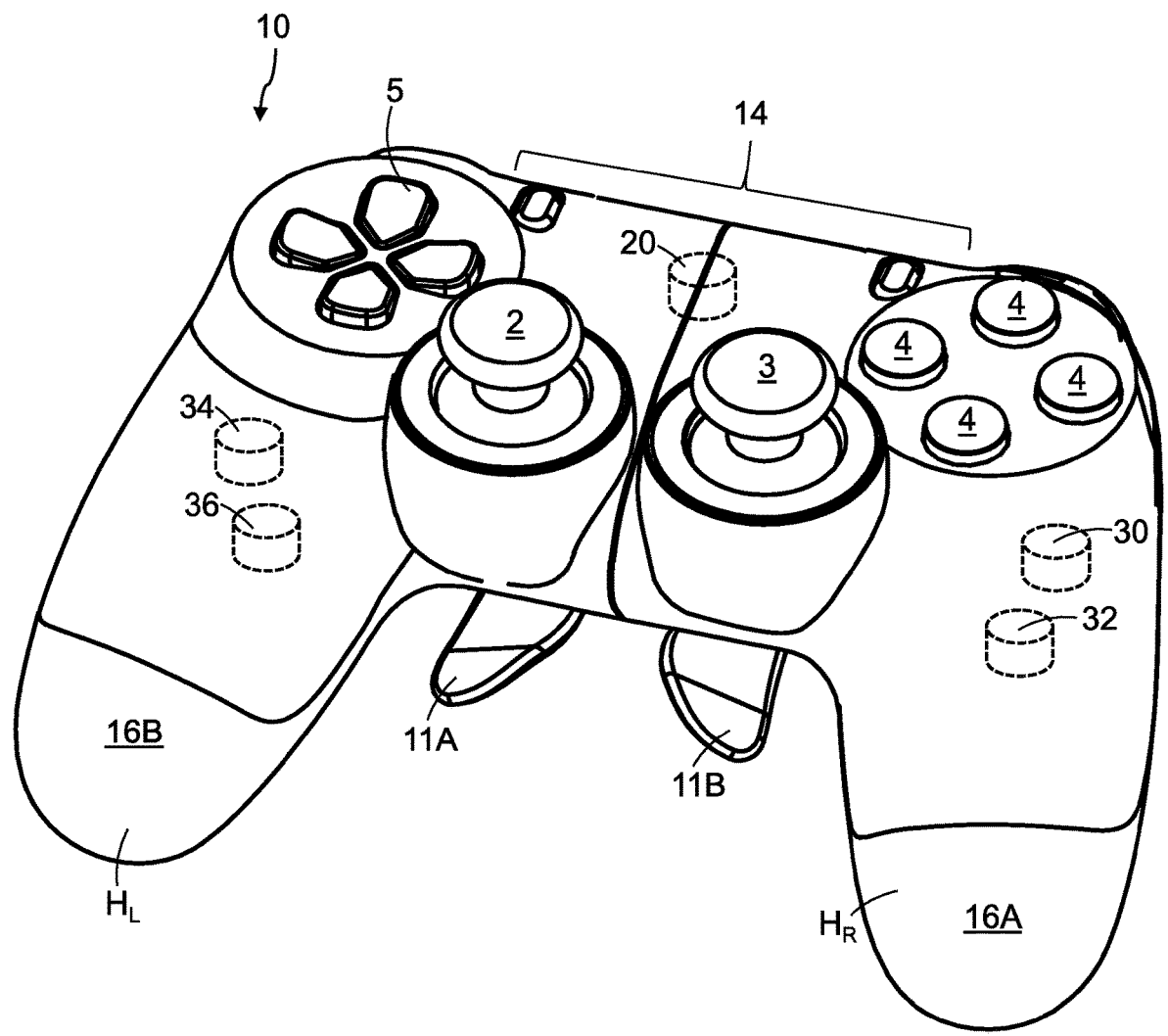
FIG. 1 is a perspective view of an input device according to a first embodiment in a first condition.

Referring to FIG. 1, there is shown an input device for a computer in the form of a video game controller 10 according to an embodiment of the invention. The controller 10 comprises an arrangement of game controls that are mounted on the front and top of the controller 10. The controller 10 comprises a left analogue thumb stick 2 and a right analogue thumb stick 3 mounted on the front of the controller 10. The left analogue thumb stick 2 and the right analogue thumb stick 3 normally control movement actions and are intended to be operated by the user's left and right thumbs respectively. The controller 10 comprises four buttons 4, located on a forward right portion of the front of the controller 10, which normally control additional in-game actions and that are intended to be operated by the user's right thumb. The controller 10 comprises a direction pad 5 located on the forward left portion of the front of the controller 10. The direction pad 5 is intended to be operated by the user's left thumb, and typically is used either as an alternative to the left thumb stick 2, or to provide additional actions.

Figure 2:
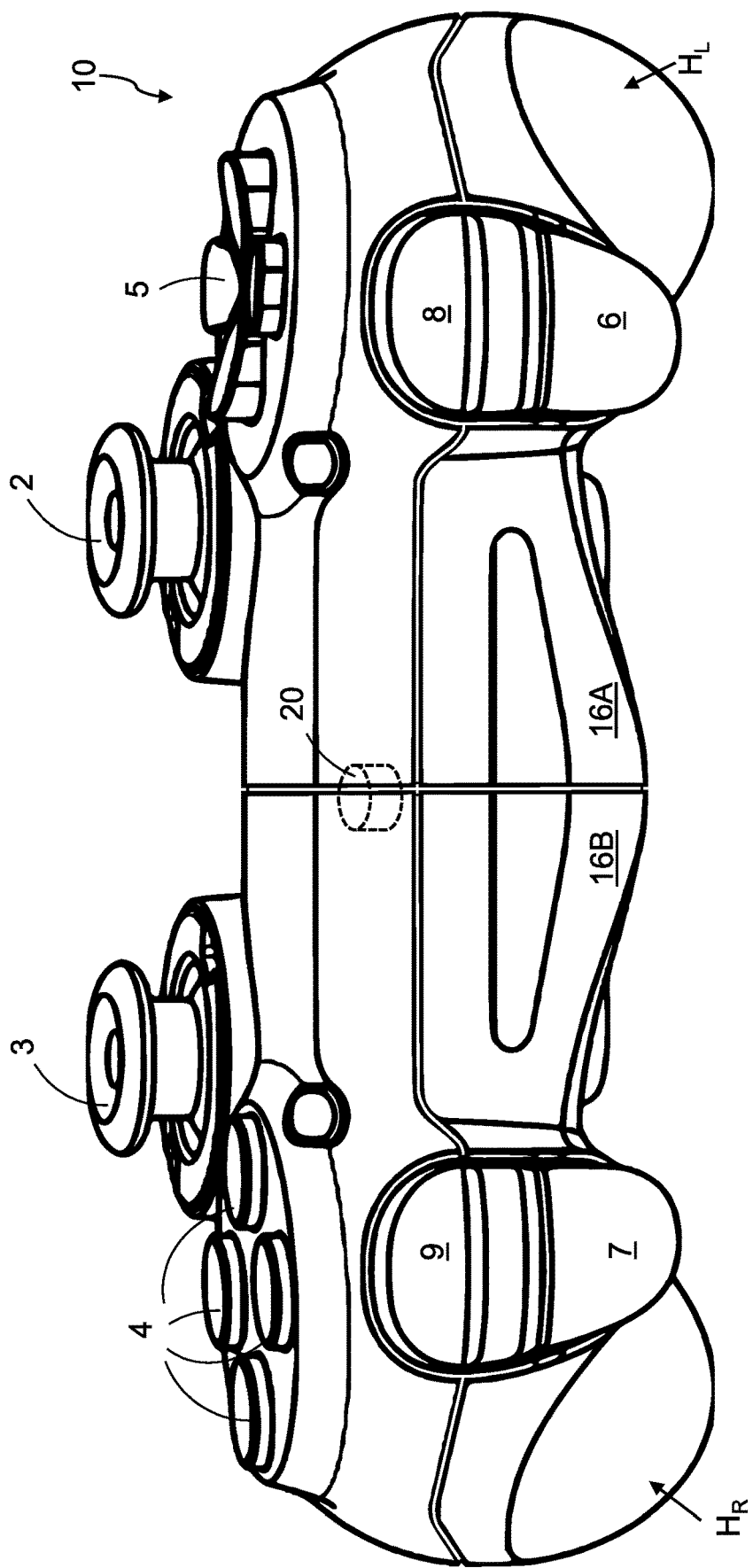
FIG. 2 is a top view of the input device of FIG. 1.

FIG. 2 illustrates a top view of the controller 10 of FIG. 1. The controller 10 also comprises a left trigger body 6, a right trigger body 7, a left bumper 8 and a right bumper 9 located on the top of the controller 10. The left and right trigger bodies 6, 7 are typically operated by a user's index fingers or forefingers. The left and right bumpers 8, 9 may also be operated by a user's index fingers or forefingers.

It can be seen that the left trigger body 6 is mounted below the left bumper 8 and the right trigger body 7 is mounted below the right bumper 9.

It will be understood that the arrangement of game controls illustrated in respect of the present embodiment is optional and may vary in other game controllers embodying the present invention, which may be applied to a variety of actuators as described below.

A user may operate the four buttons 4 on the front of the controller by removing their right thumb from the right thumb stick 3 and placing their right thumb upon one or more of the four buttons 4. This operation takes time and, in some games, can cause a loss of control. This is a particular problem in applications requiring precision, for example combat games, where the right thumb stick 3 is used for aiming a weapons cross-hair or other reticle. A similar problem may arise in games where the direction pad 5 provides additional actions and the user is required to remove their left thumb from the left thumb stick 2 in order to operate the direction pad 5.

In light of the above, there is a need for an improved controller which removes the requirement for a user to remove their thumbs from the left or right thumb sticks 2, 3 in order to operate additional actions controlled by the four buttons 4 and/or the direction pad 5.

The controller 10 comprises a first handle $H_R$ and a second handle $H_L$. The first handle $H_R$ and the second handle $H_L$ are disposed on opposing lateral sides of a central body portion 14. The first handle $H_R$ is intended to be grasped in the right hand R of a user. The second handle $H_L$ is intended to be grasped in the left hand L of a user. The user wraps one or more of the middle, ring and little fingers of the right hand R about the first handle $H_R$. The user wraps one or more of the middle, ring and little fingers of the left hand L about the second handle $H_L$.

The controller 10 may comprise one or more actuators in the form of paddle levers 11A, 11B. In the illustrated embodiment the controller 10 comprises two actuators: a first paddle lever 11A and a second paddle lever 11B, mounted on the rear of the controller 10. Each of the paddle levers 11A, 11B may be individually or separately mounted. Optionally the paddle levers are readily detachable without requiring tools. The paddle levers 11A, 11B are positioned to be operated by the middle, ring or little fingers of a user.

In the illustrated embodiment each of the actuators extends substantially in a longitudinal direction. The longitudinal direction extends from the top—to which the left and right triggers 6, 7 are mounted—of the controller 10 to the bottom of the controller 10.

A user may displace or depress either of the paddle levers 11A, 11B by engaging an outer surface thereof; such displacement causes the actuated paddle 11A, 11B to activate at least one switch mechanism. The switch mechanism may be a mechanical switch such as a tact or tactile switch, a magnetic switch such as a Hall sensor, an optical sensor, or a touch sensor such as, but not limited to, a capacitive touch switch or resistive touch switch.

Figure 3:
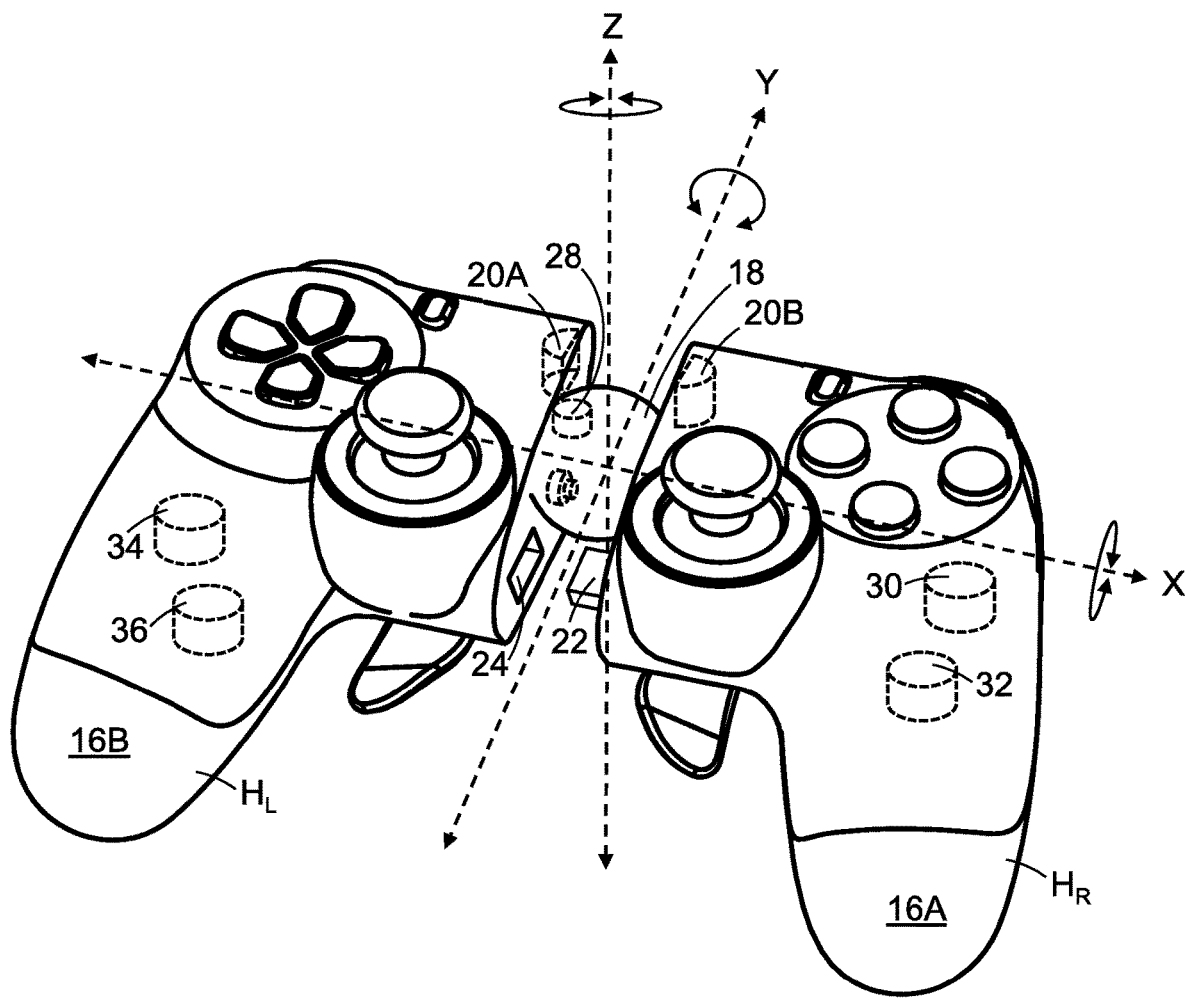
FIG. 3 is a perspective view of the input device of FIG. 1 in second condition.
Figure 4A:
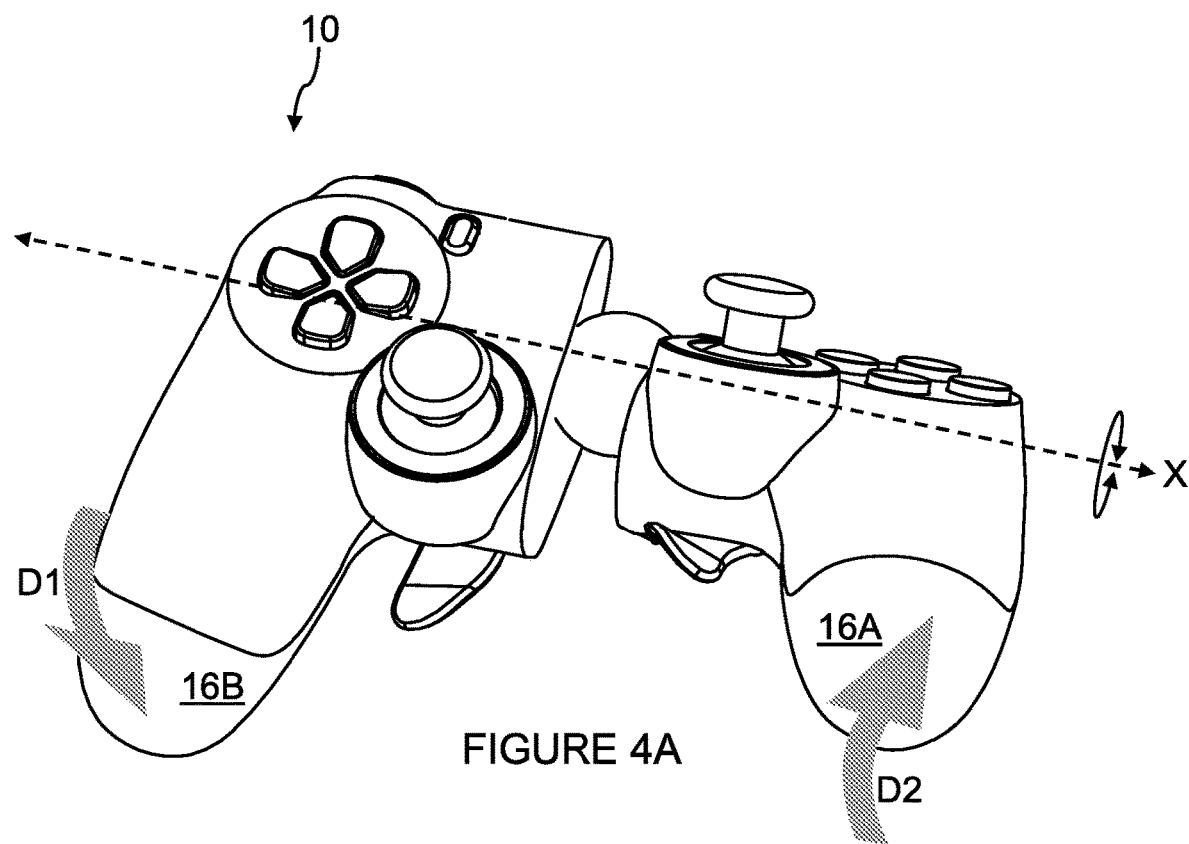
FIGS. 4A to 7 are perspective views of the input device of FIG. 2 in stages of manipulation.
Figure 4B:
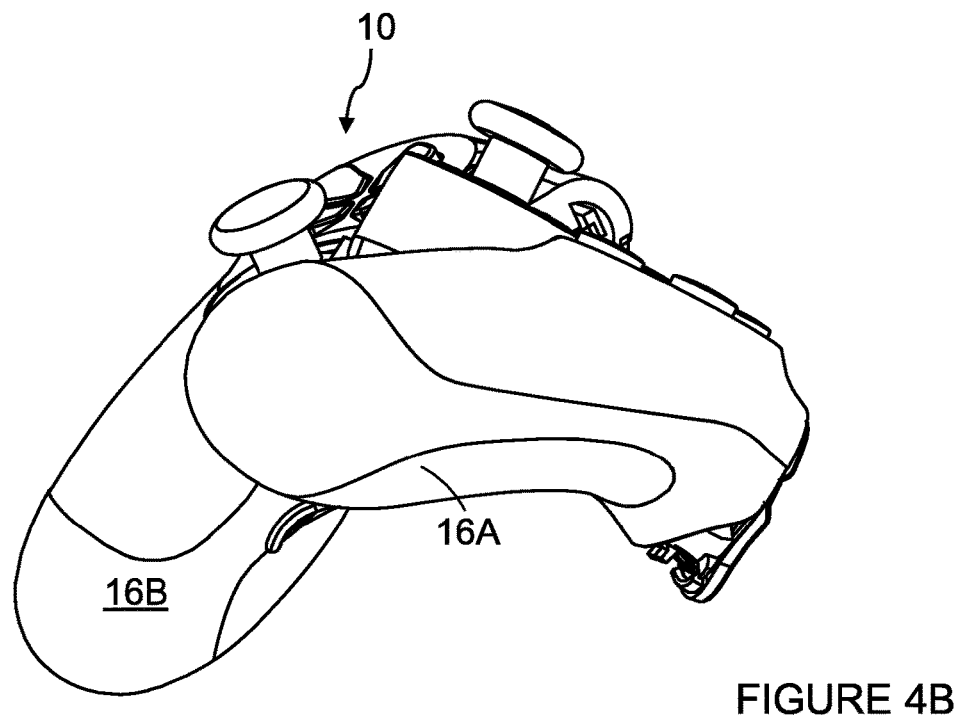
Figure 5A:
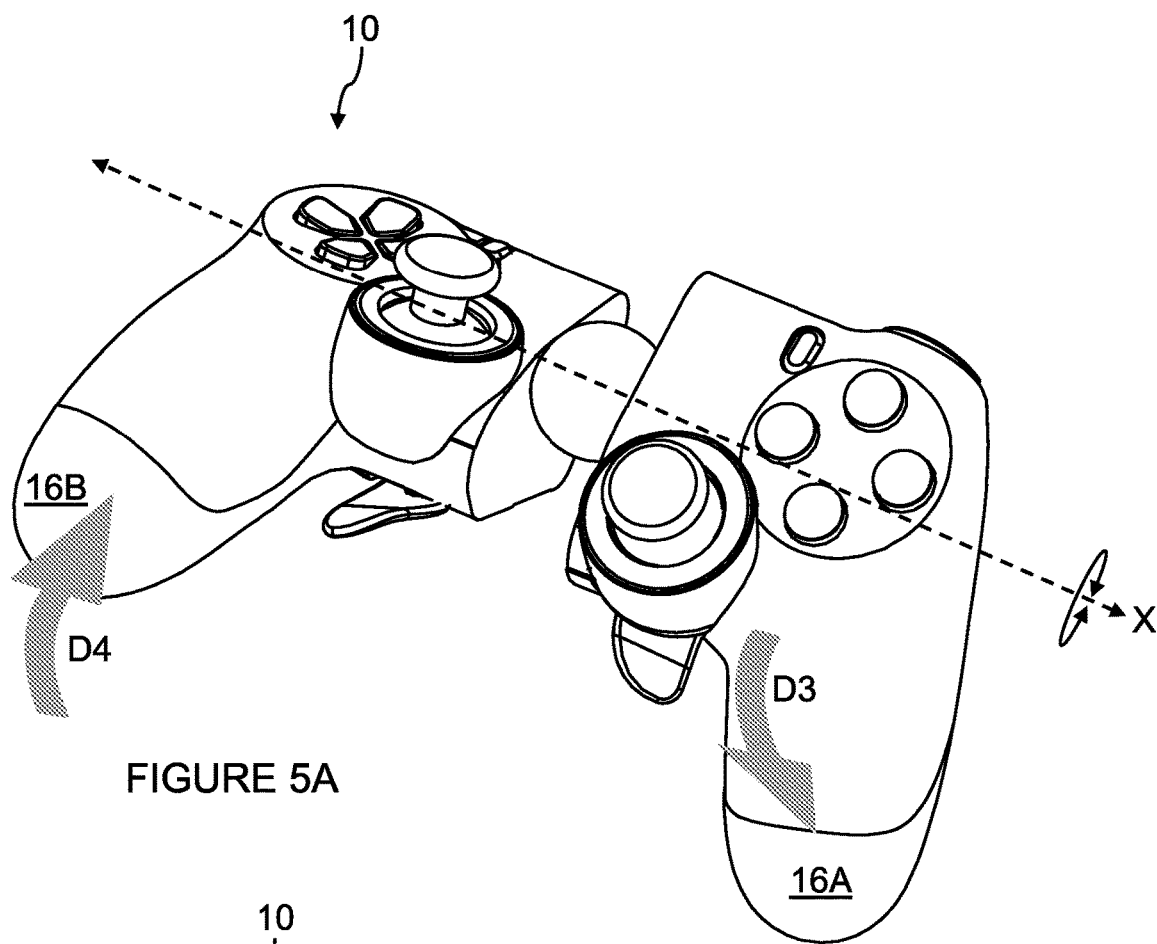
Figure 5B:
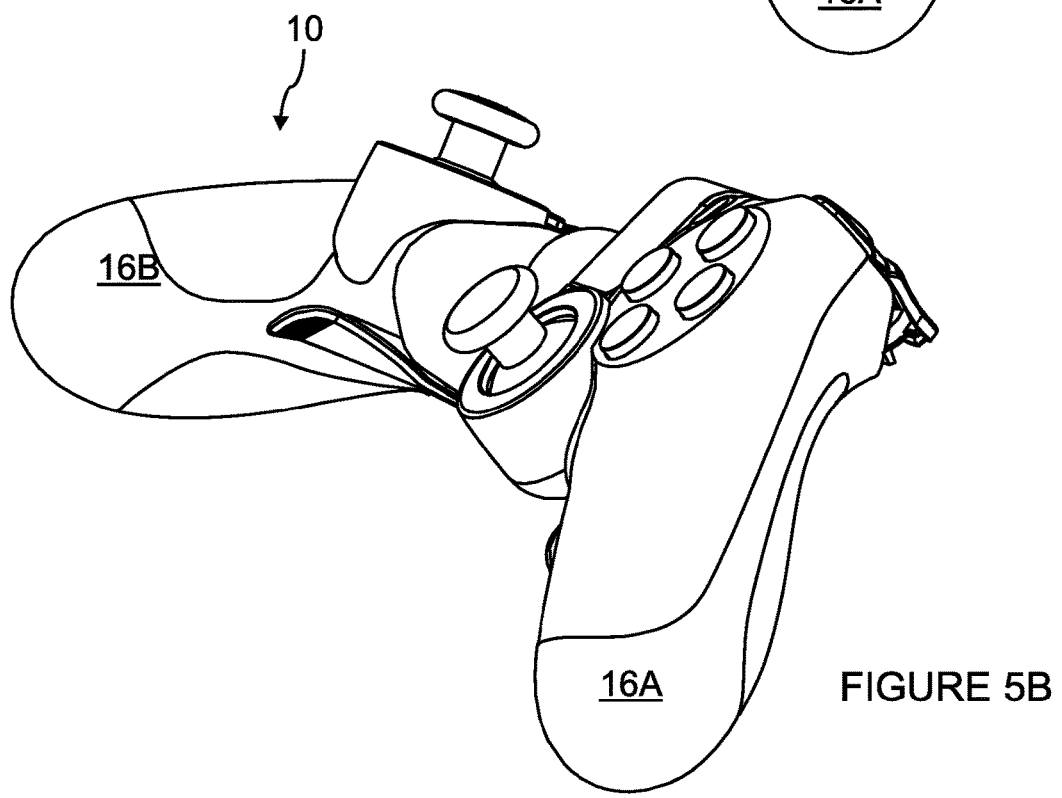

The controller 10 comprises a first part 16A coupled to a second part 16B by a coupler 18 as shown in FIG. 3. The first part 16A comprises the first handle HR and a portion of the central body portion 14, to which the right thumbstick 3, buttons 4, right bumper 9, right trigger 7 and second paddle lever 11B are mounted. The second part 16B comprises the second handle HL and a portion of the central body portion 14, to which the left thumbstick 2, direction pad 5, left bumper 8, left trigger 6 and first paddle lever 11A are mounted.

The coupler 18 may take the form of a hinge or joint. Optionally the joint is a ball joint or other suitable coupler which enables the first part 16A to be rotated with respect to the second part 16B about three mutually orthogonal axes x, y, z. In other embodiments the hinge or joint may be adapted to rotate about one axis or two orthogonal axes.

In still other embodiments the coupler 18 may take the form of a gyroscope.

In the embodiment illustrated in FIG. 1 the controller 10 can be operated in a first condition in which the first and second parts 16A, 16B are disposed in close proximity. This may be considered a closed or stowed condition. The controller 10 may comprise a securing device 20 for holding the first and second parts 16A, 16B together. The securing device 20 may take the form of one or more permanent magnets 20A, 20B for engaging with another permanent magnet or magnetic material 20A, 20B.

In other embodiments the securing device 20 may take the form of a catch or latch 20A and a retainer 20B for receiving the catch. The securing device 20 may comprise a release mechanism for releasing the catch. The first and second parts 16A, 16B may be resiliently biased with respect to each other such that when the catch is released the first and second parts automatically separate or move away from one another so as to be spaced apart from one another.

The controller 10 may comprise an alignment guide 22/24. The alignment guide may take the form of at least one projection and at least one complementary recess for receiving the projection when the first and second parts 16A, 16B are aligned. In the illustrated embodiment the alignment guide comprises a lug 22 and a lug receiver 24. In other embodiments the alignment guide may take the form of a tongue and groove arrangement; a ridge or tongue may be provided around at least a portion of the peripheral edge of the end of one of the first and second parts, and a groove or trough around at least a portion of the peripheral edge of the end of the other one of the first and second parts, wherein the first and second parts are brought into an overlapping relationship with one another when in abutment.

The controller 10 comprises at least one sensor for determining the relative position or orientation of the first part 16A with respect to the second part 16B. In one embodiment the controller 10 may comprise a first sensor 28, for example in the form of a potentiometer or Hall sensor, for measuring an electrical characteristic such as resistance, or a magnetic characteristic such as a magnetic field strength or flux density or polarity. Other sensors may be employed which measure other electrical characteristics such as capacitance or inductance. The electrical characteristic of the potentiometer or the magnetic characteristic of the Hall Effect sensor may change or vary depending upon the position of the first part 16A with respect to the second part 16B. In this way the first sensor 28 may be employed to provide a control function. The first sensor 28 may employ two or more potentiometers or Hall sensors so as to enable the relative orientation between the first and second parts 16A 16B to be determined in two or more dimensions or directions.

In some embodiments a separate sensor may be employed to measure rotation about each axis of rotation x, y, z of the coupler.

In some embodiments the sensor 28 may take the form of one or more strain gauges or torque sensors.

In other embodiments, the first and second parts 16A, 16B may each comprise one or more position sensors 30, 32, 34, 36 for example, but not limited to, accelerometers, gyroscopes, gyro sensors (angular rate sensors or angular velocity sensors), magnetometers, or geomagnetic field sensors.

In still other embodiments the sensors may take the form a plurality of sensors, arranged at different locations upon the controller. Some of the sensors may be transmitters and other sensors may be receivers. Alternatively the sensors may be transceivers. A processing unit may be employed to compare measured data with reference data so as to enable a determination of the position and/or orientation of the first part with respect to the second part.

The controller may comprise a calibration mode to collect the reference data.

The sensors may transmit electromagnetic radiation, for example but not limited to radio waves, visible or infrared radiation. The radiation may be encoded or modulated such that the transmitted signal can be isolate from background radiation in the same frequency, in a simple form this may take the form of pulsing the transmitter between on and off states. The transmitters and receivers may be arranged in pairs. On part of the controller comprising the transmitter the other part comprising the receiver, each transmitter/receiver pair may be individually encoded to avoid interference from other transmitter/receiver pairs.

The transmitter may be Light emitting diodes or laser diodes. The receivers may by photo-sensors in the form of photodiodes.

Alternative embodiments may employ a camera or other image sensor such as a CCD or CMOS image sensor. The image sensor may be coupled to a processing unit which compares the captured image with a reference image to determine the position and/or orientation of the first part with respect to the second part.

It will be appreciated that the controller may employ a number sensors of different types.

FIGS. 1 and 2 illustrate the controller in a first mode of operation in which the first and second parts 16A, 16B are in a stowed condition.

FIGS. 3 to 7 illustrate the controller in a second mode of operation in which the first and second parts 16A, 16B have been opened by displacing one with respect to the other. The first and second parts 16A, 16B in the opened condition are rotatable with respect to each other; in this way the coupler 18 and sensor 28 form part of an actuator mechanism enabling the controller 10 to control a further control function. Advantageously, the user needs only to move one hand with respect to the other to access the additional control function. The user does not have to relinquish control over any of the other controls with which they are engaged.

In the opened condition the relative movement between the first and second parts 16A, 16B may be used to provide an input to a computer (not shown).

In other embodiments the relative position of the first part 16A with respect to the second part 16B may be adjusted for ergonomic reasons so as to enhance the comfort of the user and may, for example, reduce the likelihood of repetitive strain injury or fatigue of the user.

Figure 6A:
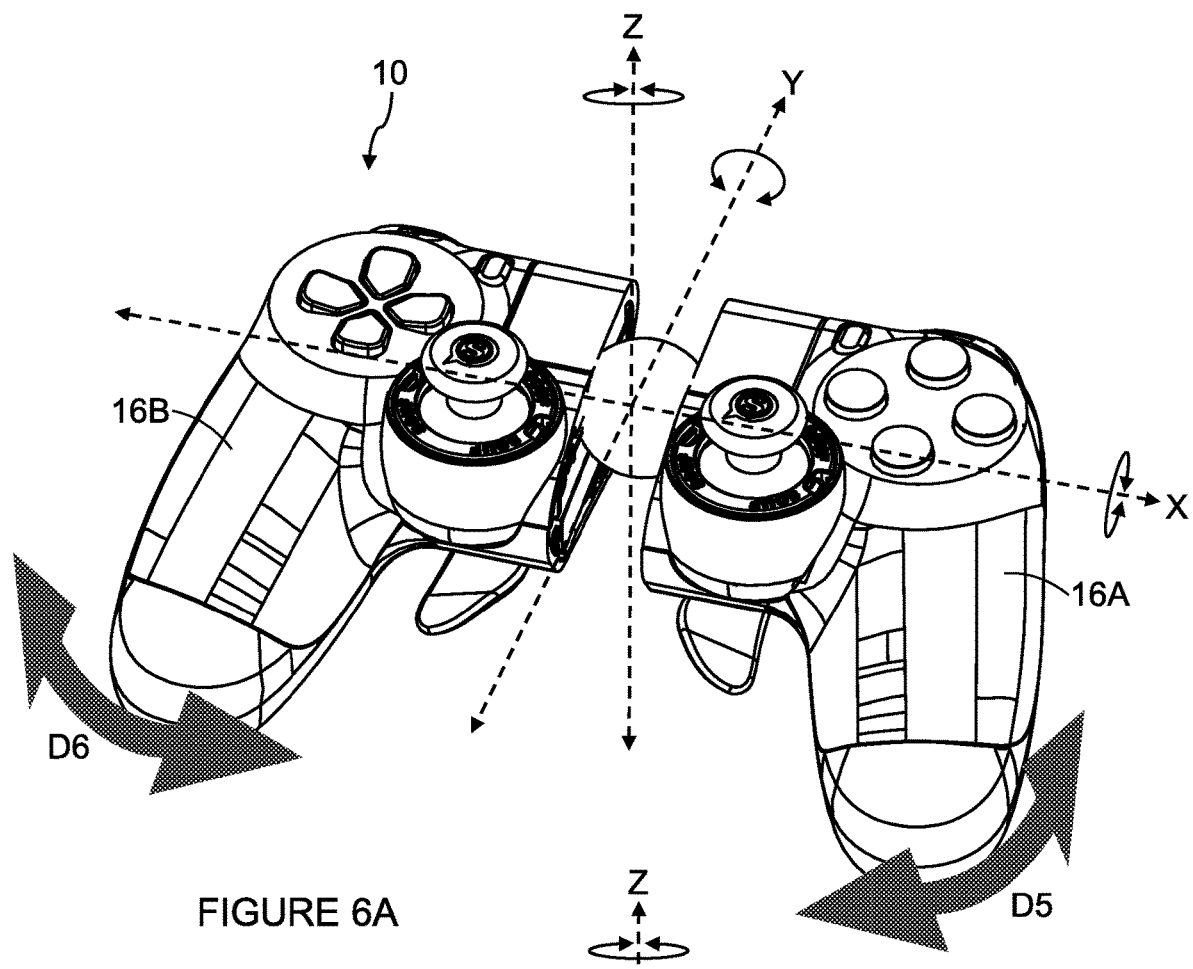
Figure 6B:
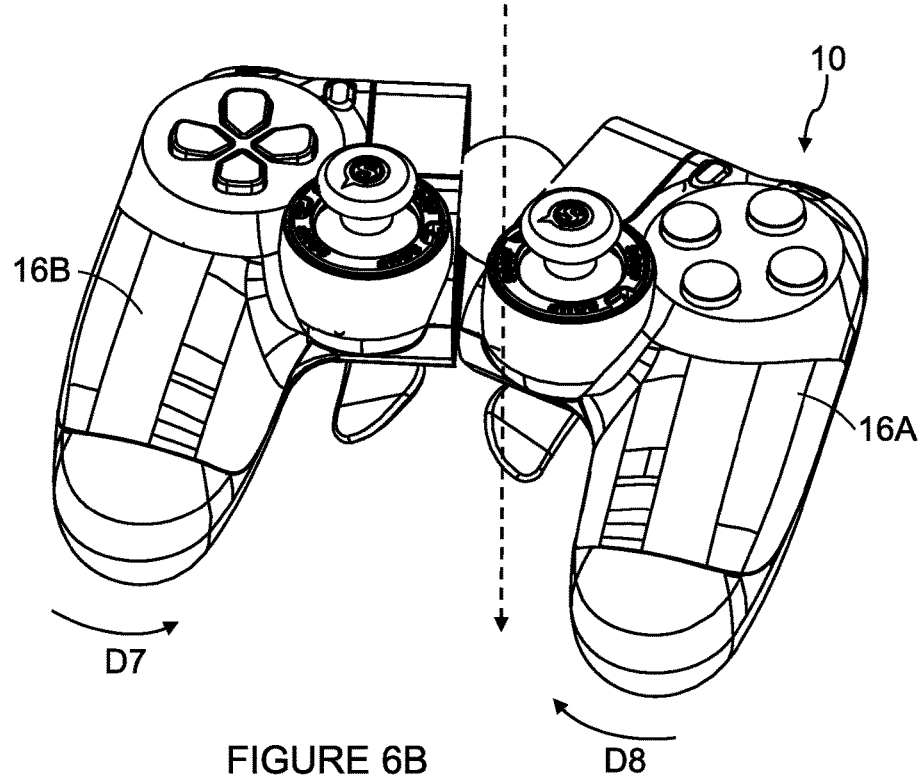
Figure 7:
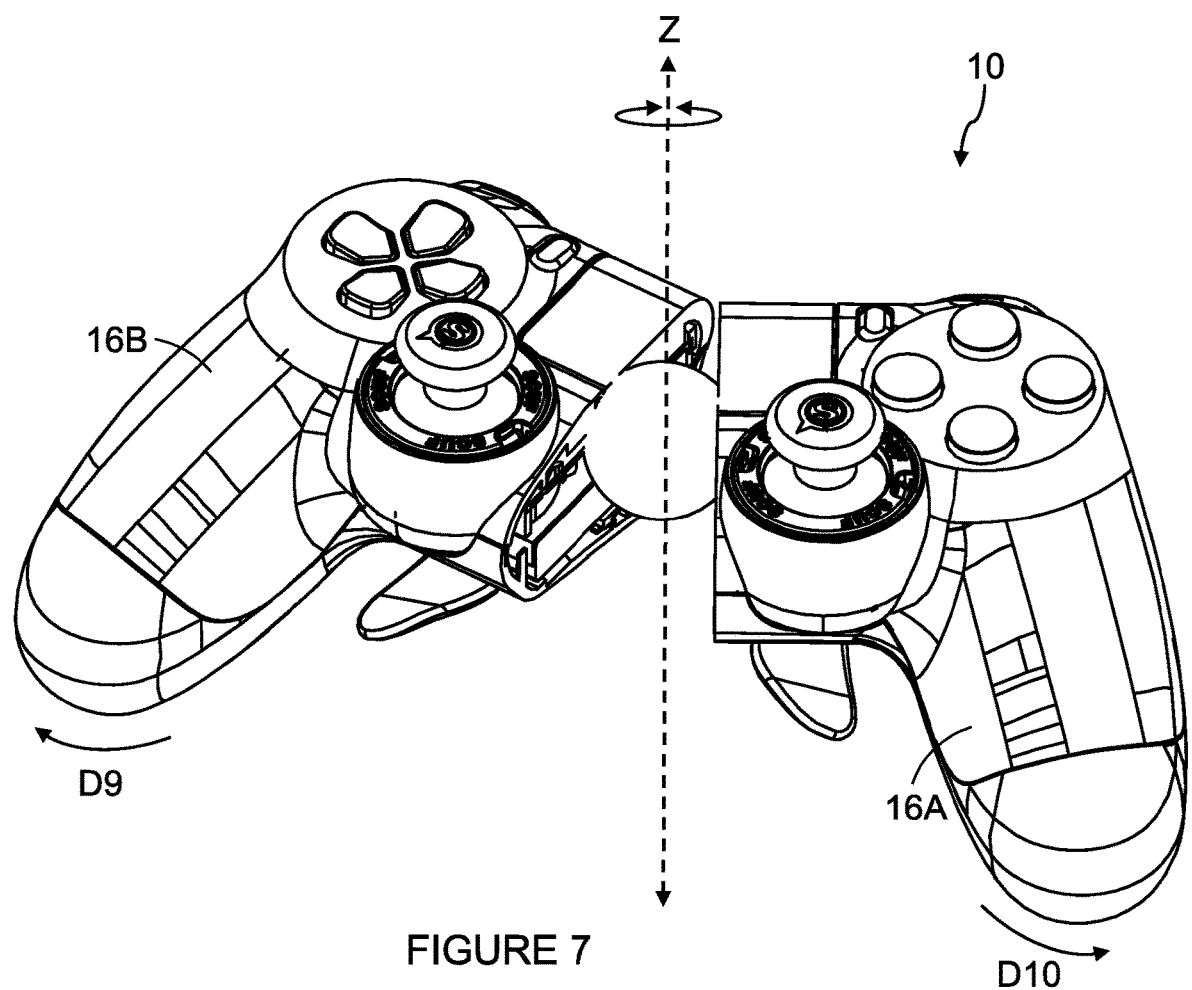

FIGS. 4A to 7 illustrate the controller 10 in use. In FIGS. 4A to 5B, the first and second parts 16a, 16B of the controller 10 are rotated with respect one another about the x axis. In FIGS. 6A to 7 the first and second parts 16a, 16B of the controller 10 are rotated with respect one another about the z axis.

In some embodiments the controller 10 may comprise a switch mechanism associated with the coupler 18. The switch mechanism may be activated by pushing one of the first and second parts 16A, 16B towards the other of the first and second parts 16A, 16B. In such embodiments the controller 10 may be fixed or secured in the open condition; in this way, the switch mechanism may be activated when the controller 10 is disposed in the open condition. In some embodiments the first part 16A and second part 16B may be arranged such that the switch mechanism can be activated in the closed or stowed condition. This may be achieved by configuring the controller 10 such that the first and second parts 16A, 16B can be displaced towards each other when in the closed or stowed condition. The degree of freedom of movement need only be sufficient to actuate a switch mechanism such as a tact switch. The first and second parts 16A, 16B may be resiliently biased to return to the stowed position after actuation of the switch mechanism. In this way the switch mechanism may provide yet another control function, or may alternatively replicate a control function provide by one of the other actuators or buttons.

Alternatively, the first part 16A may be permanently spaced apart from the second part 16B, that is to say the controller 10 may not comprise the stowed position in which the coupler 18 is disposed internally of the housing of the first part 16A, second part 16B or both.

Referring now to FIGS. 8A to 9B, there are shown alternative embodiments. In the second, third and fourth illustrated embodiments like numerals have, where possible, been used to denote like parts, albeit with the addition of the prefix "100", "200", "300" to indicate that these features belong to the second, third and fourth embodiments respectively. The alternative embodiments share many common features with the first embodiment and therefore only the differences from the embodiment illustrated in FIGS. 1 to 7 will be described in any greater detail.

Figure 8A:
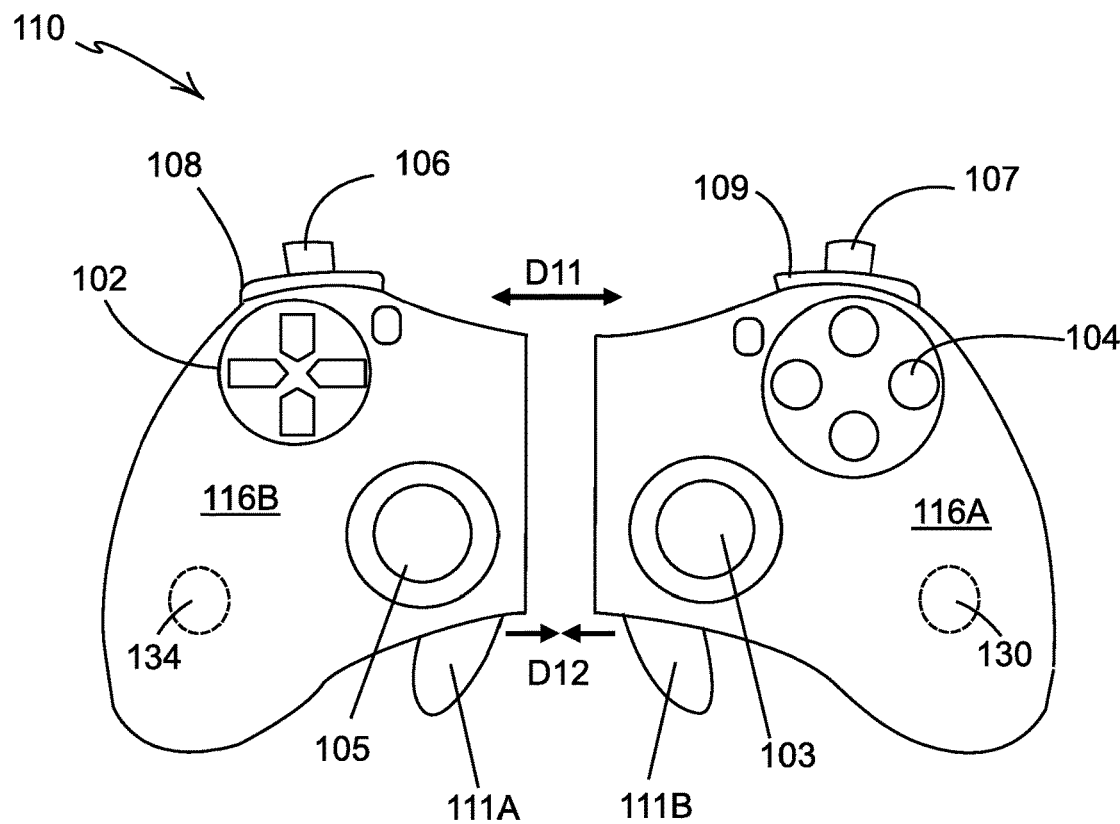
FIG. 8A is a plan view of an input device according to a second embodiment.
Figure 8B:
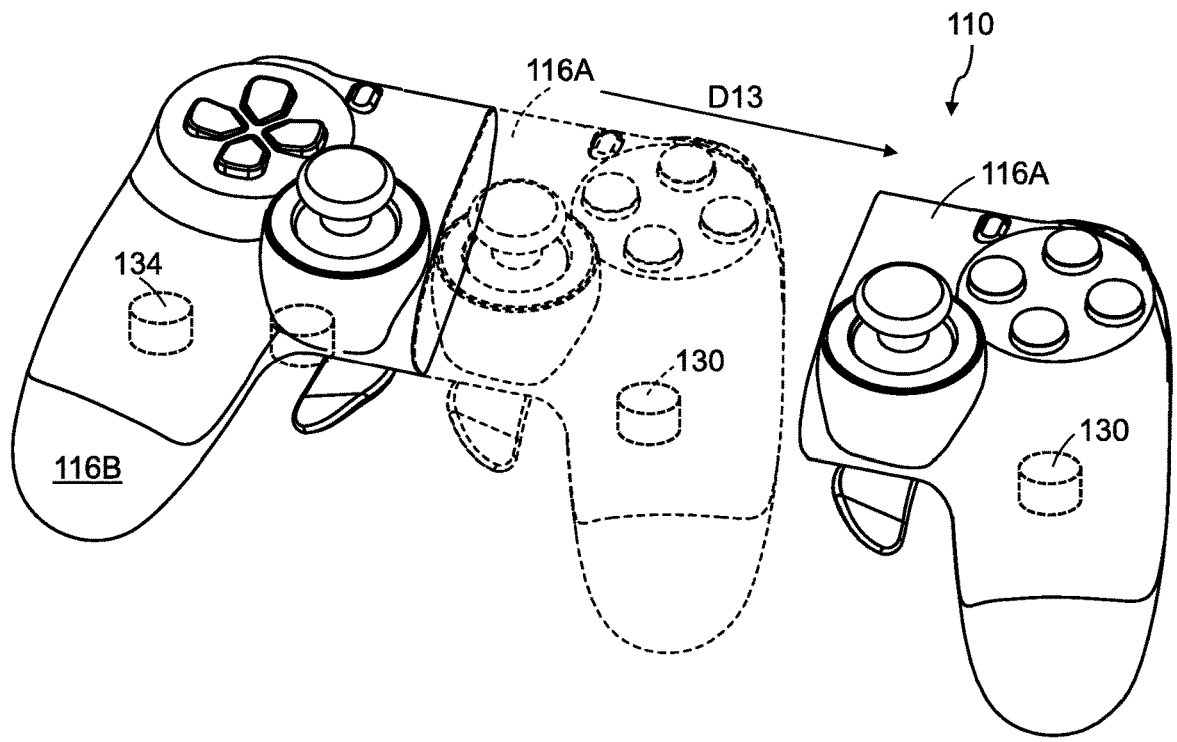
FIG. 8B is a perspective view of the input device of FIG. 8A.

In the embodiment of FIGS. 8A and 8B, the first part 116A may be detached from the second part 116B so as to be separated therefrom. In this embodiment the degree of movement between the first and second parts 116A, 116B is not limited by the chassis, housing or other parts of the controller 110 since the first part 116A is free from connection to the second part 116B.

Figure 9A:
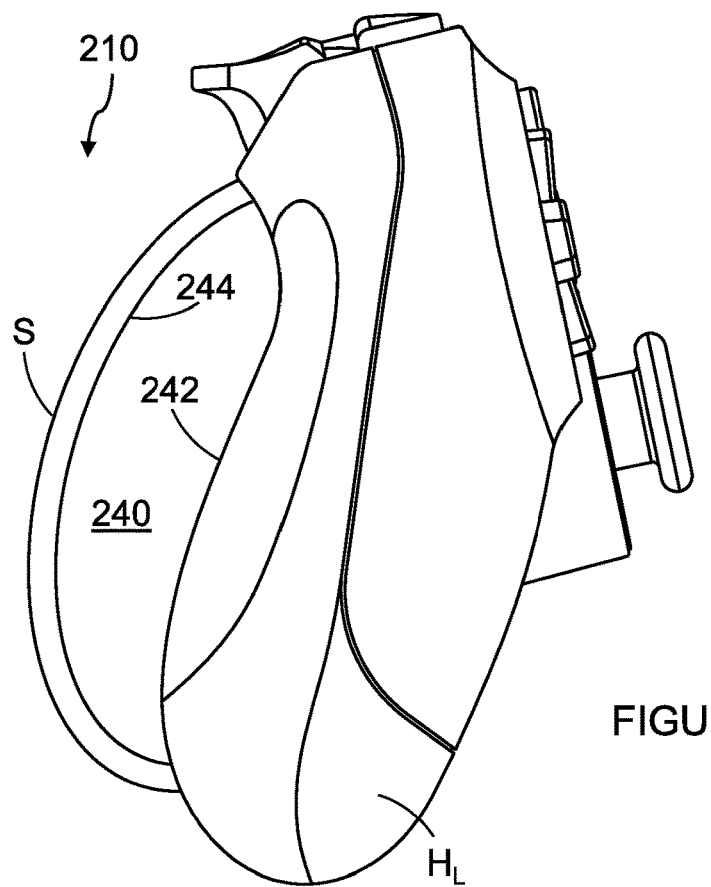
FIG. 9A is an end view of an input device according to a third embodiment.
Figure 9B:
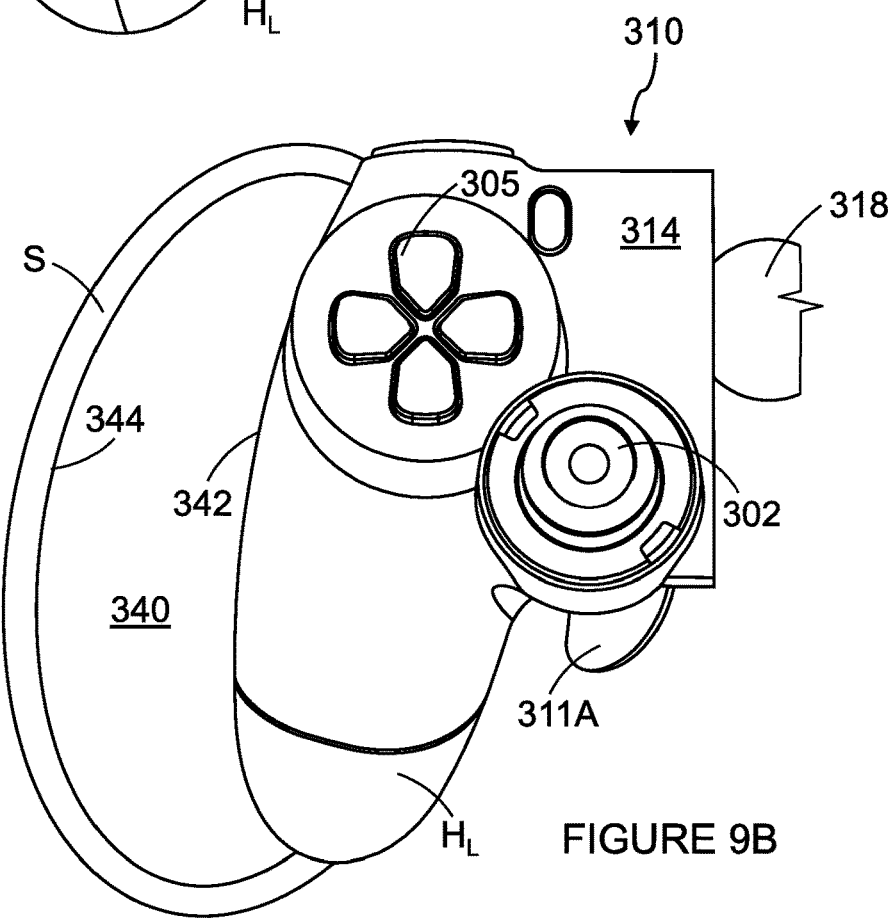
FIG. 9B is a plan view of an input device according to a fourth embodiment.

In the embodiment of FIG. 9A each of the first and second parts of the controller 210 (only the second part 216B is visible) comprises a stirrup or strap S which defines in part an orifice or opening 240 for receiving one or more fingers of a user's hand. The strap S enables the user to engage with an internal surface 244 of the strap S with the back of the fingers inserted in the opening O. The user may also engage or grasp the outer surface 242 of the handle HL. The strap S may facilitate manipulation of the first part (not shown in FIG. 9A) with respect to the second part 216B. The internal surface 244 of the strap S or the outer surface 242 of the handle HL may be contoured so as to define one or more, optionally two or three, finger receiving grooves or recesses. In other embodiments the position of the strap S may be varied, for example the strap S may be arranged so as to extend over the back of a user's hand rather than the back of the fingers, see FIG. 9B.

In this way the user can insert at least a portion of their hand into the handle on each side of the controller 310. The handles enable the user to hold the controller 310 without requiring them to grasp or grip the handles $H_L$, $H_R$ by closing their fingers thereabouts. In this way the user may employ any finger to activate the controls thereon.

The present disclosure provides a controller and an actuator mechanism mounted to a controller. The actuator mechanism enables a user to access at least one control function by manipulation of the actuator mechanism. The user may manipulate the actuator by holding the controller in both hands and moving one of their hands with respect to the other hand. In some embodiments of the present disclosure there is provided an actuator which can be stowed away when not in use. The actuator may comprise a plurality of distinct or distinguishable degrees of freedom of movement; the actuator requires specific manipulations or actions to activate a desired one of a plurality of control functions associated with the actuator.

In one embodiment there is provided a controller having a first part and second part, at least one of which comprises a sensor for determining the relative position of the parts, the relative position may include the relative orientation of the first and second parts.

It is envisaged that the controllers may be coupled to a games console or computer by a wired connection or by a wireless connection device.

It can be appreciated that various changes may be made within the scope of the present invention. Whilst in the foregoing embodiments the input device has been described with reference to a hand held games controller for use with a home video games console or other personal computer, in alternative embodiments the input device may be employed with other hand held electronic devices, for example but not limited to a portable handheld games console (a single unit comprising the console, screen, speakers, and controls), a mobile telephone, tablet computer, phablet computer. The input device may be integrated within such portable devices or may form part of an accessory apparatus such as, but not limited to, a case or caddy or other removable jacket arranged to accommodate the portable input device for use with a virtual reality system.

In some embodiments the input device may take the form of a keyboard, such as but not limited to a QWERTY keyboard. A first part of the keyboard comprises a first portion of the keys and a second part of the keyboard comprises a second portion of the keys. In such embodiments the first and second parts of the keyboard may be manipulated so as to adjust the orientation of the first and second parts with respect to each other, in order to provide an ergonomic shape adaptable to the desired orientation of the user.

The keyboard may comprise one or more stirrups or straps to enable the user to hold the keyboard with one or both hands. The coupler may be adapted so as to provide an analogue input actuator similar to that of a mouse or tracker ball. In this way the user need not rest the keyboard upon a desk. One or more actuators may be provided upon the rear or bottom surface of the keyboard. Such actuators may take the form of paddle levers, button or keys. The rear mounted actuators may provide additional functionality for example to enable switching between two mode of operation for example a "keyboard mode" in which the keys are enabled and the analogue actuator is disabled, and a "mouse mode" in which the keys are disabled and the analogue actuator is enabled. The rear mounted actuators may replicate functions provided by the front mounted keys, for example but not limited to those keys of a conventional keyboard normally operated by a user's thumb such as the space bar, thus enabling the user the grasp the keyboard with their thumbs disposed about the rear of the keyboard.

It will be recognized that as used herein, directional references such as "top", "bottom", "front", "back", "end", "side", "inner", "outer", "upper" and "lower" do not limit the respective features to such orientation, but merely serve to distinguish these features from one another.

What is claimed is:

1. An apparatus for supplying user inputs to a computer program, the apparatus comprising:
   a case having a first part and a second part;
   each of the first and second parts comprising one or more controls;
   a securing device for holding the first part and the second part together; and
   at least one of the first and second parts comprising:
      a sensor for determining the position of the first part relative to the second part, wherein the apparatus is configured for a first mode of operation in which the first and second parts are in a stowed condition and held together by the securing device and a second mode of operation in which the first and second parts are opened by displacing one with respect to the other and are movable with respect to each other, and wherein in the second mode of operation the position of the first part relative to the second part provides an input control device.

2. The apparatus according to claim 1 wherein the sensor is analogue.

3. The apparatus according to claim 1 wherein the first part is detachably connected to the second part.

4. The apparatus according to claim 1 wherein the first part is pivotally coupled to the second part by a coupler rotatable about at least one rotation axis.

5. The apparatus according to claim 1 wherein the first part is pivotally coupled to the second part by a coupler rotatable about three orthogonal rotation axes.

6. The apparatus according to claims claim 4 wherein the coupler comprises a ball joint including a ball and socket arrangement.

7. The apparatus according to claim 4 wherein the apparatus comprises a switch mechanism providing a digital input control.

8. The apparatus according to claim 7 wherein the switch mechanism comprises a mechanical switch actuable by displacement of the first part relative to the second part.

9. The apparatus according to claim 1 wherein the first part is mounted to the second part by a spherical bearing.

10. The apparatus according to claim 1 wherein the first part is mounted to the second part by a trunnion and cradle arrangement.

11. The apparatus according to claim 1 wherein the first and second parts comprise a plurality of controls located on a front and top of the apparatus and at least one additional control located on a rear of the apparatus.

12. The apparatus according to claim 1 wherein each of the first and second parts comprise a handle having an opening for receiving at least in part a user's hand.

13. The apparatus according to claim 12 wherein the handle comprises a stirrup for engaging with the back of a user's hand.

14. The apparatus according to claim 4 wherein the first part is moveable with respect to the second part between a first condition in which the coupler is stowed at least in part within one of the first and second parts and a second deployed condition in which the first part is spaced apart from the second part.

15. An apparatus for supplying user inputs to a computer program, the apparatus comprising:
   a case having a first part and a second part;
   each of the first and second parts comprising one or more controls;
   wherein the first part is pivotally coupled to the second part by a coupler rotatable about at least one rotation axis and wherein the apparatus is configured for a first mode of operation in which the first and second parts are in a stowed condition and a second mode of operation in which the first and second parts are opened by displacing one with respect to the other and are movable with respect to each other.

16. The apparatus according to claim 15 wherein the first part is coupled to the second part by a spherical bearing.

17. The apparatus according to claim 15 wherein the first part is coupled to the second part by a ball and socket arrangement.

18. The apparatus according to claim 15 wherein the case comprises a plurality of faces including a top, bottom, front and rear, the first and second parts each comprise a handle shaped to be held in one hand of a user such that the user's thumbs are positioned to operate controls located on a first one of the faces of the apparatus and such that the user's index fingers are positioned to operate controls located on a second one of the faces of the apparatus.

* * * * *